United States Patent
Masuda et al.

(10) Patent No.: US 9,056,330 B2
(45) Date of Patent: Jun. 16, 2015

(54) FUNCTIONAL ROLL PRODUCTION METHOD

(71) Applicants: Masuda Seisakusho Co., Ltd., Toyoake, Aichi (JP); Masroll Systems Inc., Toyoake, Aichi (JP)

(72) Inventors: Masanobu Masuda, Aichi (JP); Noriaki Masuda, Aichi (JP)

(73) Assignees: Masuda Selsakusho Co., Ltd., Toyoake, Aichi (JP); Masroll Systems, Inc., Toyoake, Aichi (JP)

( * ) Notice: Subject to any disclaimer, the term of this patent is extended or adjusted under 35 U.S.C. 154(b) by 32 days.

(21) Appl. No.: 13/782,941

(22) Filed: Mar. 1, 2013

(65) Prior Publication Data

US 2014/0246152 A1    Sep. 4, 2014

(51) Int. Cl.
   *B32B 37/04*    (2006.01)
   *B29C 65/02*    (2006.01)
   *B05C 11/10*    (2006.01)
   *B24D 13/08*    (2006.01)
   *B29D 99/00*    (2010.01)

(52) U.S. Cl.
   CPC ............. *B05C 11/10* (2013.01); *B24D 13/08* (2013.01); *B29C 65/02* (2013.01); *B29D 99/0035* (2013.01)

(58) Field of Classification Search
   CPC .... B29D 99/0035; D21G 1/024; B24D 13/08; B29C 65/02
   USPC ............ 156/308.2, 309.6; 492/38–41, 49; 100/193, 194
   See application file for complete search history.

(56) References Cited

U.S. PATENT DOCUMENTS

| | | | | |
|---|---|---|---|---|
| 1,973,690 | A | * | 9/1934 | Lade ................ 492/41 |
| 3,804,157 | A | * | 4/1974 | Wenig ............... 165/55 |
| 4,669,163 | A | * | 6/1987 | Lux et al. ............ 492/41 |
| 4,753,713 | A | * | 6/1988 | Gunderson ........... 162/383 |
| 5,038,469 | A | * | 8/1991 | Masuda et al. ....... 29/895.213 |
| 5,615,470 | A | * | 4/1997 | Ceraso ............... 29/469.5 |
| 5,765,256 | A | * | 6/1998 | Allan et al. ........ 15/230.12 |
| 2011/0039672 | A1 | * | 2/2011 | Masuda et al. ........ 492/28 |

FOREIGN PATENT DOCUMENTS

| | | |
|---|---|---|
| JP | H05-180216 A | 7/1993 |
| JP | 2521903 U | 4/1996 |
| JP | 2012-127375 A | 7/2012 |

* cited by examiner

*Primary Examiner* — Scott W Dodds
(74) *Attorney, Agent, or Firm* — K&L Gates LLP; Louis C. Cullman; Michelle Glasky Bergman

(57) ABSTRACT

A functional roll comprises a shaft body, a roll body, flanges, and bearings. The roll body is formed by stacking multiple module functional rolls. The module functional rolls are formed by stacking multiple nonwoven fabric sheets. The module functional rolls have a bore in which the shaft body is inserted. A module function roll is united.

8 Claims, 25 Drawing Sheets

200 μm (×95)

FUNCTIONAL ROLL PRODUCTION METHOD

FIELD

This application relates to a functional roll production method.

BACKGROUND

Having the roll body capable of absorbing a fluid (water) and supplying a fluid (water or water for rinsing), functional rolls are used in processing many products. For example, the functional rolls are used in manufacturing vehicles, iron, films, electronics materials, and other precision instrument. A large number of functional rolls are exported overseas as well.

The functional rolls are conventionally produced in an assembled and united fashion (for example, see Patent Literature 1 and 2).

The functional roll described in Patent Literature 1 is formed by superimposing highly repulsive and inviscid nonwoven fabric sheets and spring-back prevention sheets such as adhesive rubber sheets in a close contact fashion. More specifically, a spring-back prevention sheet such as a rubber sheet is interposed in every block.

The functional roll described in Patent Literature 2 presents the basic structure of the functional roll described in Patent Literature 1.

Patent Literature 1: Unexamined Japanese Patent Application Kokai Publication No. H5-180216; and
Patent Literature 2: Unexamined Japanese Patent Application Kokai Publication No. H3-219115.

The above-described functional rolls of the Patent Literature 1 and 2 are produced in an assembled and united fashion and assumed to be transported as a completed product.

However, the functional rolls are a large, long structure and it is difficult to transport them. Because of their large size, the transportation cost is high. Particularly, it is remarkably difficult to export the functional rolls overseas.

The present invention is invented under the above circumstances and an exemplary object of the present invention is to facilitate the transportation of functional rolls.

SUMMARY

In order to achieve the above object, the functional roll production method of the present invention is a method of producing a functional roll comprising a rotation shaft and a roll body comprising nonwoven fabric sheets provided on the rotation shaft, including the following steps:

stacking multiple nonwoven fabric sheets shaped into a circular form with an opening in the center while a mounting shaft is inserted in the opening;

clamping a nonwoven fabric sheet group comprising the multiple stacked nonwoven fabric sheets with a set of a first jig and a second jig, and compressing the nonwoven fabric sheet group in the direction parallel to the mounting shaft via the jigs;

securing the set of jigs to each other to unite the nonwoven fabric sheets forming the nonwoven fabric sheet group;

heating the united nonwoven fabric sheet group so that the nonwoven fabric sheets forming the nonwoven fabric sheet group adhere to each other; and removing the mounting shaft and jigs from the nonwoven fabric sheets adhering to each other to create a module comprising the nonwoven fabric sheets adhering to each other.

The present invention can produce the modules of a functional roll (module functional rolls, hereafter). A functional roll can be assembled from the module functional rolls at the customer's place. Therefore, the module functional rolls, which are smaller than the functional roll, can be delivered to the customer, facilitating the transportation.

BRIEF DESCRIPTION OF THE DRAWINGS

A more complete understanding of this application can be obtained when the following detailed description is considered in conjunction with the following drawings, in which.

DETAILED DESCRIPTION

1. Functional Roll

Figure 1:
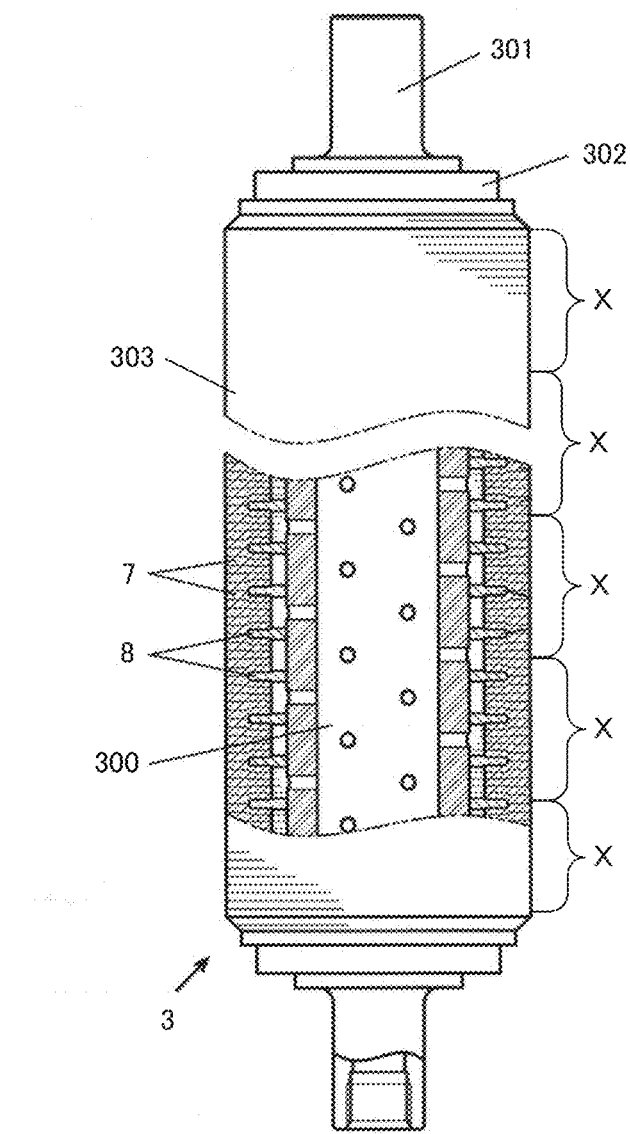
FIG. 1 is a front view showing the entire functional roll.

FIG. 1 shows a functional roll 3 according to this embodiment. The functional roll 3 comprises a shaft body 300 (rotation shaft), a roll body 303, flanges 302, and bearings 301. The shaft body 300 is cylindrical and hollow and has pores on the outer peripheral surface. The shaft body 300 has grooves extending in the axial direction on the outer peripheral surface (not-shown). The roll body 303 is formed around the shaft body 300. The roll body 303 is in the form of a column having a bore in the center through which the shaft body 300 runs. The flanges 302 and bearings 301 are formed at both ends of the shaft body 300, respectively.

Figure 2A:
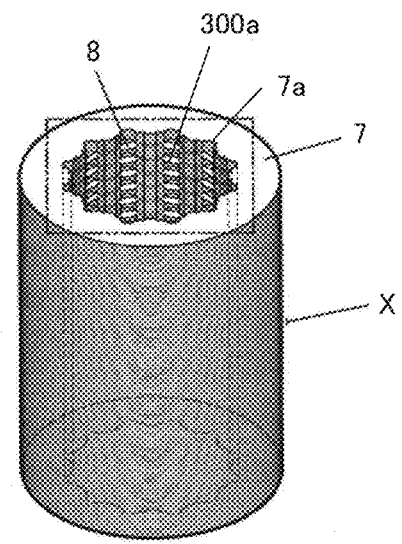
FIG. 2A is a perspective view showing a module functional roll.
Figure 2B:
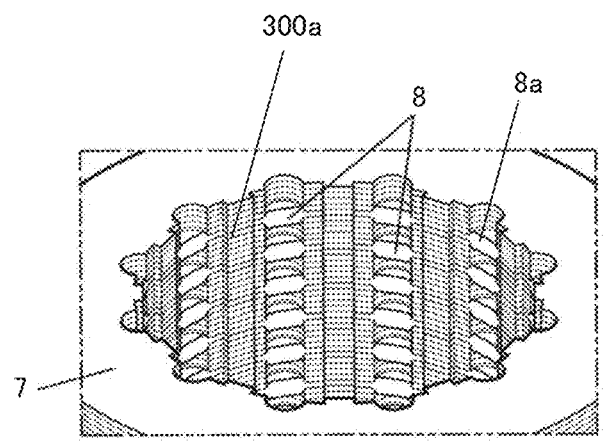
FIG. 2B is an enlarged perspective view of a part of the module functional roll.
Figure 2C:
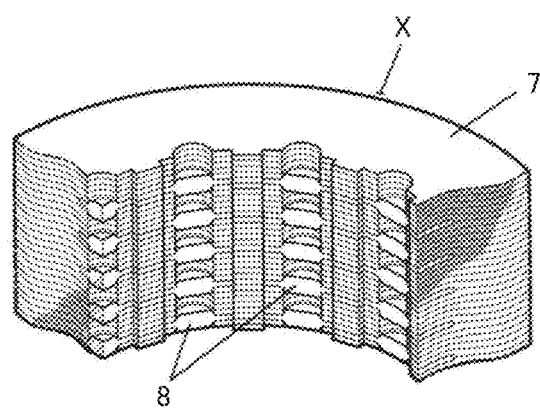
FIG. 2C is an enlarged perspective view of a part of the module functional roll.

The roll body 303 of the functional roll 3 is formed by stacking multiple module functional rolls X. FIGS. 2A to 2C show a module functional roll X. The module functional roll X is in the form of a column having a bore 300a in the center. The module functional roll X is formed by stacking multiple nonwoven fabric sheets 7 and nonwoven fabric sheets 8. The module functional roll X is united and cannot be disassembled unless some special treatment is done. Both the nonwoven fabric sheet 7 and the nonwoven fabric sheet 8 are in the form of a thin disc having a hole in the center.

Figure 3A:
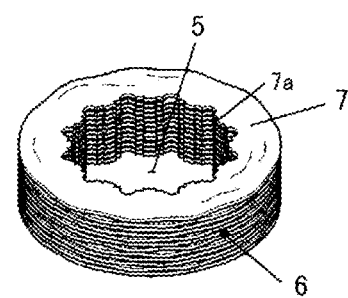
FIG. 3A is a perspective view showing stacked nonwoven fabric sheets.
Figure 3B:
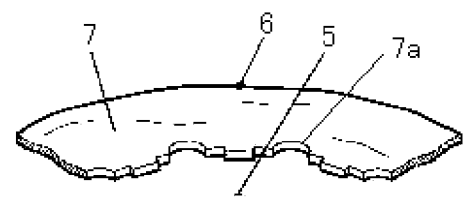
FIG. 3B is an enlarged perspective view of a part of a nonwoven fabric sheet.

FIGS. 3A and 3B show the nonwoven fabric sheet 7. FIG. 3A shows multiple fabric sheets 7 stacked. FIG. 3B shows a piece of a nonwoven fabric sheet 7. The nonwoven fabric sheet 7 has a circular outer peripheral surface 6 and a through-hole 5 (opening) in the center. The outer periphery of the hole 5 (the inner peripheral surface of the nonwoven fabric sheet 7) is slightly irregular. The shaft body 300 is inserted in the hole 5. The nonwoven fabric sheet 7 has multiple notches 7a on the inner peripheral surface at given intervals.

Figure 4A:
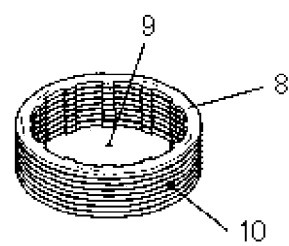
FIG. 4A is a perspective view showing stacked nonwoven fabric sheets.
Figure 4B:
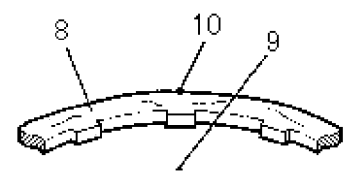
FIG. 4B is an enlarged perspective view of a part of a nonwoven fabric sheet.

FIGS. 4A and 4B show the nonwoven fabric sheet 8. FIG. 4A shows multiple fabric sheets 8 stacked. FIG. 4B shows a piece of a nonwoven fabric sheet 8. The nonwoven fabric sheet 8 has a circular outer peripheral surface 10 and a through-hole 9 (opening) in the center. The outer periphery of the hole 9 (the inner peripheral surface of the nonwoven fabric sheet 8) is slightly irregular. The shaft body 300 is inserted in the hole 9.

As shown in FIGS. 2A to 2C, the module functional roll X is formed by stacking multiple nonwoven fabric sheets 7 and one nonwoven fabric sheet 8 alternately. The hole 5 of the nonwoven fabric sheets 7 and the hole 9 of the nonwoven fabric sheet 8 are stacked to form the bore 300a of the module functional roll X.

The center bore 300a of the module functional roll X has a diameter nearly equal to the diameter of the outer circumferential circle of the shaft body 300 and the shaft body 300 is inserted in the center bore 300a of the module functional roll X. The protrusions of the above-described nonwoven fabric sheets 7 and 8 are inserted and locked in the axial grooves of the shaft body 300 to prevent the nonwoven fabric sheets 7 and 8 from shifting in the circumferential direction or deforming.

After the shaft body 300 is inserted in the center bore 300a of the module functional roll X, the notches 7a of the nonwoven fabric sheets 7 face the shaft body 300 and create semicircular spaces between the shaft body 300 and module functional roll X.

On the other hand, the nonwoven fabric sheet 8 has no notch. After the shaft body 300 is inserted in the center bore 300a of the module functional roll X, almost the entire inner periphery of the nonwoven fabric sheet 8 reaches the outer periphery of the shaft body 300. Stacked alternately with multiple nonwoven fabric sheets 7 having notches 7a, the nonwoven fabric sheet 8 seems to have multiple extensions 8a reaching the outer periphery of the shaft body 300 around the bore 300a (the inter periphery of the nonwoven fabric sheet 8) at given intervals. The extensions 8a partition a semicircular column space formed by a notch 7a and the shaft body 300 at given intervals in the axial direction. Multiple nonwoven fabric sheets 7 and one nonwoven fabric sheet 8 are stacked alternately so that the nonwoven fabric sheet 8 is situated at given intervals along a mounting shaft 2.

Figure 5:
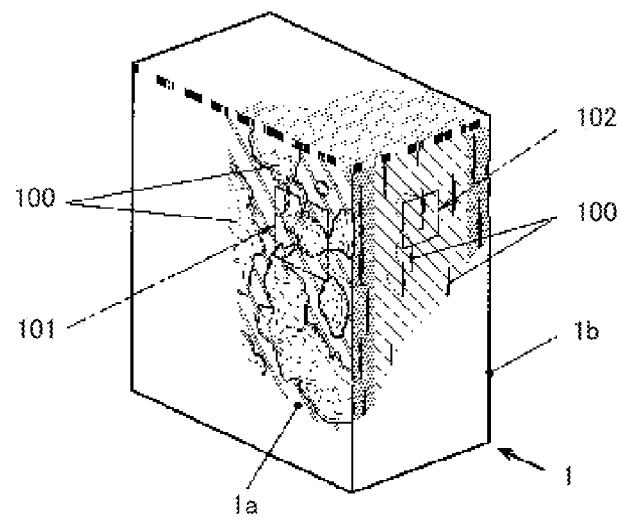
FIG. 5 is a perspective view of a nonwoven fabric sheet material.
Figure 6A:
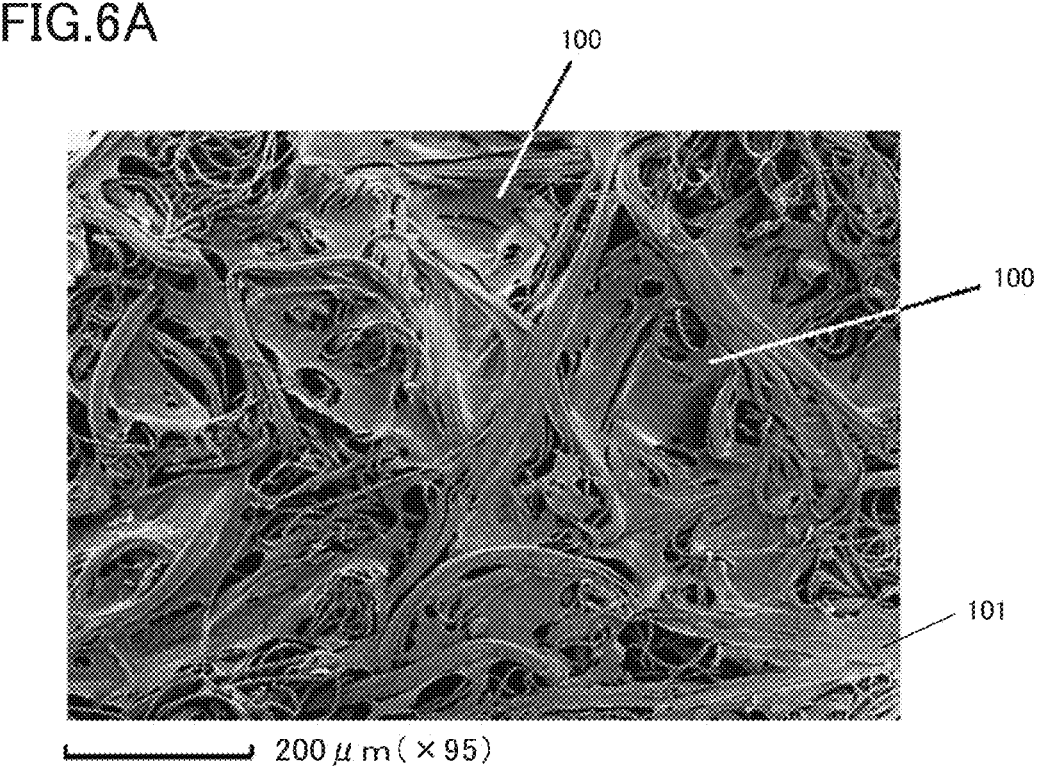
FIG. 6A is an enlarged view of the superimposed surface.
Figure 6B:
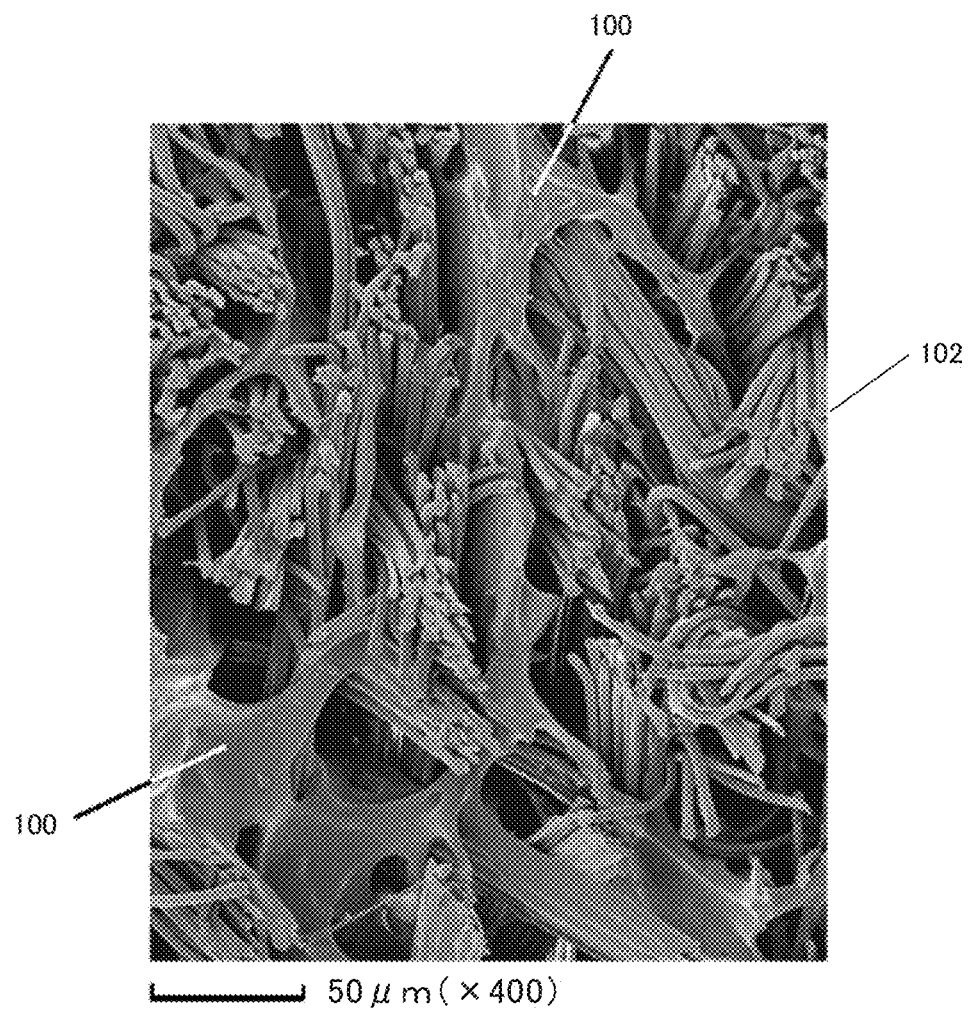
FIG. 6B is an enlarged cross-sectional view of a nonwoven fabric sheet material.

Both the nonwoven fabric sheet 7 and the nonwoven fabric sheet 8 are made of porous materials. The nonwoven fabric sheet 8 (the second nonwoven fabric sheet) has a lower density than the nonwoven fabric sheet 7 (the first nonwoven fabric sheet). FIG. 5 shows a nonwoven fabric sheet material 1 used as the material of the nonwoven fabric sheet 7 or nonwoven fabric sheet 8. Membrane-like bridging elastic bodies 100 are present on the superimposed surfaces 1a and 1b of the nonwoven fabric sheet material 1. FIG. 6A is an enlarged view of the superimposed surface 1a in FIG. 5. FIG. 6B is an enlarged cross-sectional view of a nonwoven fabric sheet material. As shown in FIGS. 6A and 6B, the bridging elastic bodies 100 are present on the superimposed surfaces 1a and 1b of the nonwoven fabric sheet material 1.

2. Functional Roll Production Method (2-1. Production of Nonwoven Fabric Sheets 7 and 8)

Figure 7A:
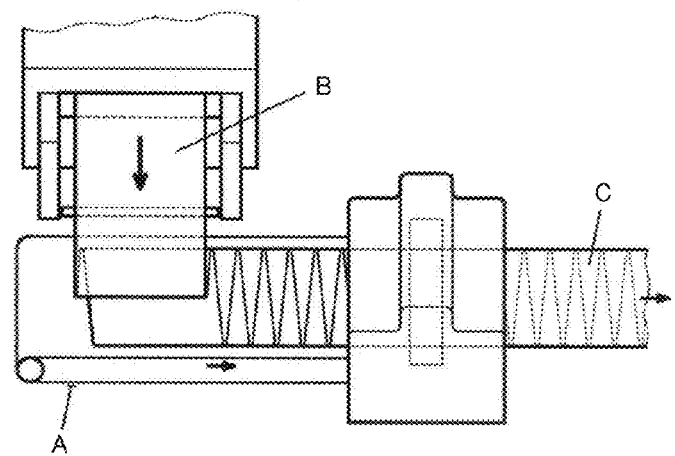
FIG. 7A is a schematic plane view showing the first half of the nonwoven fabric sheet material production process.
Figure 7B:
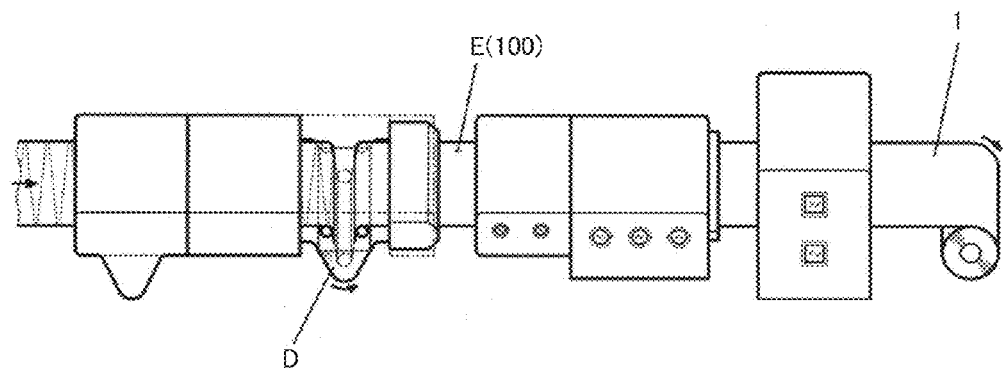
FIG. 7B is a schematic plane view showing the second half of the nonwoven fabric sheet material production process.

The method of producing the above-described functional roll 3 will be described hereafter. First, the method of producing the nonwoven fabric sheet material 1 used as the material of the nonwoven fabric sheet 7 and nonwoven fabric sheet 8 will be described. FIGS. 7A and 7B show an exemplary method of producing the nonwoven fabric sheet material 1. First, as shown in FIG. 7A, a strip of nonwoven fabric material B is stacked/superimposed in a pleat-like fashion on a transfer conveyer A so as to create a wide nonwoven fabric C. Then, as shown in FIG. 7B, the nonwoven fabric C is immersed in a bridging elastic material reservoir D so that a bridging elastic material E is attached to the entire nonwoven fabric C. With the bridging elastic material E (the bridging elastic bodies 100) attached to the front and back sides of the nonwoven fabric C, a larger amount of the bridging elastic material E is attached to the front and back sides (the superimposed surfaces 1a and 1b). Then, aftertreatment such as rinsing and drying is performed to complete the nonwoven fabric sheet material 1. The completed nonwoven fabric sheet material 1 is used to form the nonwoven fabric sheet 7 and/or nonwoven fabric sheet 8. The nonwoven fabric sheets 7 and 8 can be formed by punching out the nonwoven fabric sheet material 1 or forming a ring shape from the strip.

(2-2. Production of Module Functional Roll X)

Figure 8A:
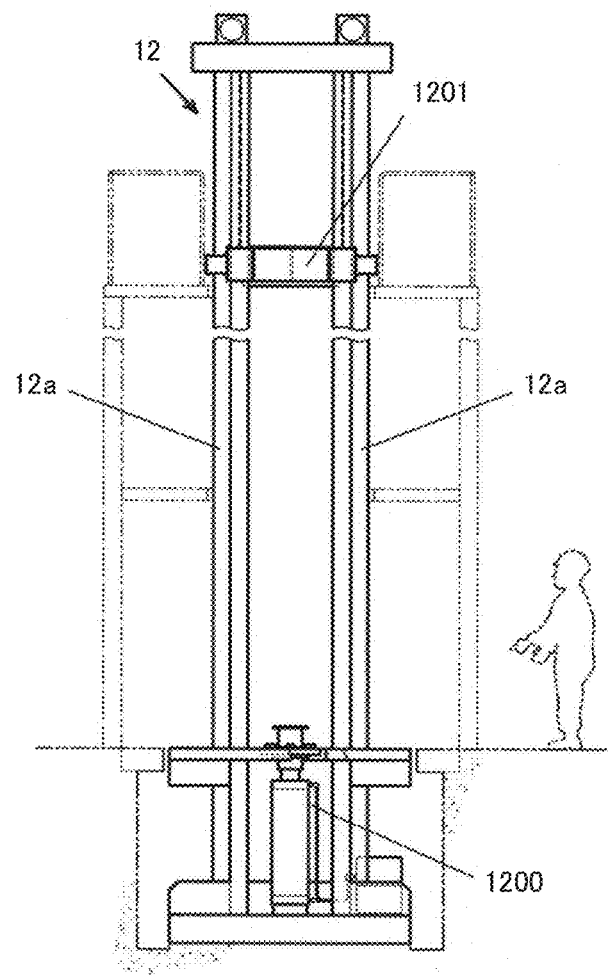
FIG. 8A is a partially-omitted schematic side view showing an exemplary pressing machine.

The method of producing the module functional roll X using the formed nonwoven fabric sheets 7 and 8 will be described hereafter. A pressing machine 12 shown in FIG. 8A is used for producing the module functional roll X. The pressing machine 12 has a cylinder 1200, a frame 12a, and a pressing collar 1201.

Figure 8B:
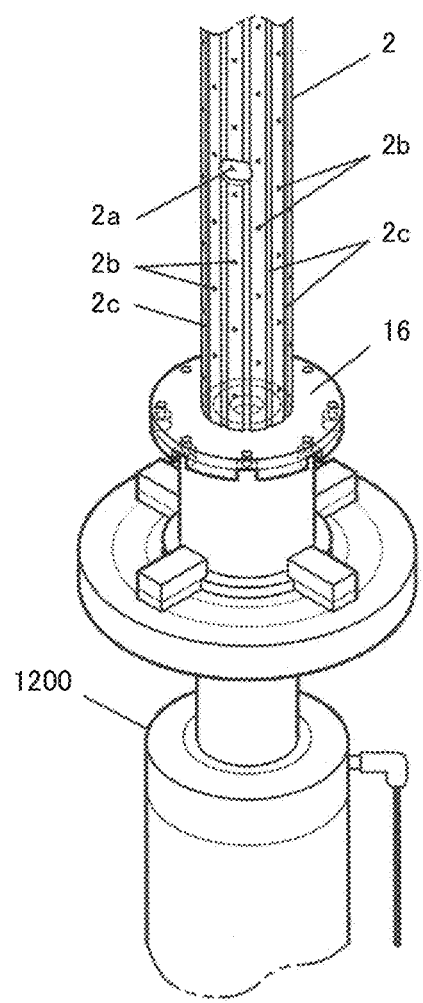
FIG. 8B is an enlarged perspective view showing a part of the pressing machine.

FIG. 8B is an enlarged perspective view of a part of the pressing machine 12. FIG. 8B shows the cylinder 1200, one clamping jig 16, and a mounting shaft 2. The mounting shaft 2 has a hollow 2a, pores 2b, and locking grooves 2c. The hollow 2a is a hollow space inside the mounting shaft 2. The multiple pores 2b are formed in the peripheral wall of the mounting shaft 2. The pores 2b communicate with the hollow 2a. The multiple locking grooves 2c extend in the axial direction of the mounting shaft 2 and situated at given intervals on the peripheral wall of the mounting shaft 2. The protrusions provided on the inner peripheral surface of the nonwoven fabric sheets 7 and 8 are inserted and locked in the locking grooves 2c.

The pressing collar 1201 in FIG. 8A is movable in the vertical direction along the frame 12a. The pressing collar 1201 comprises an insert hole for the mounting shaft 2 shown in FIG. 8B.

Figure 9A:
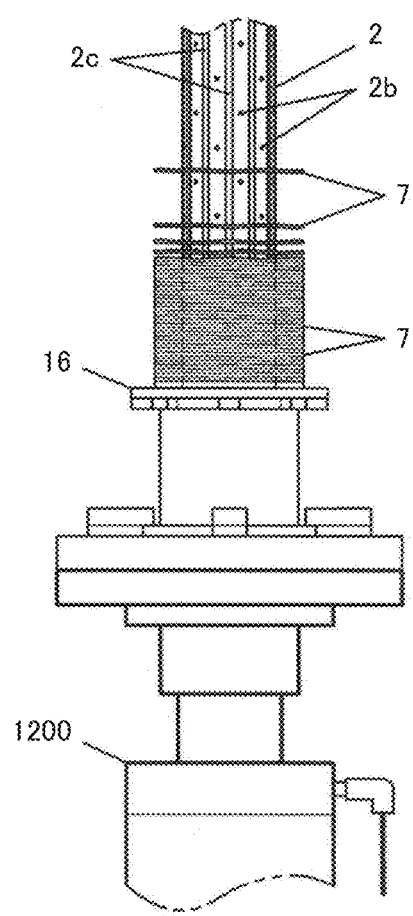
FIG. 9A is an illustration showing the module functional roll production process.
Figure 9B:
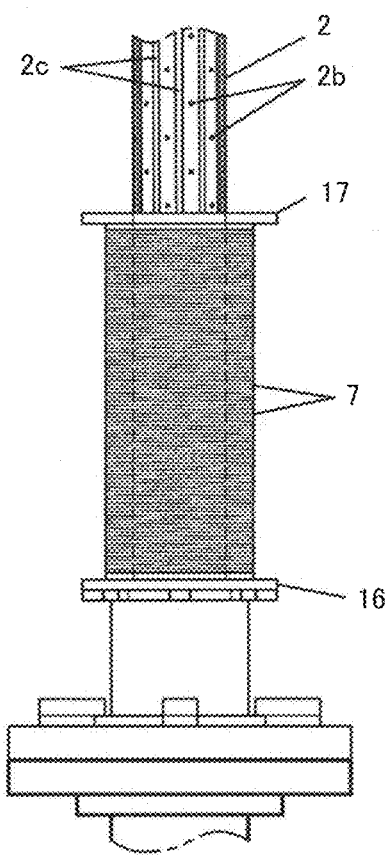
FIG. 9B is an illustration showing the module functional roll production process.

In the module functional roll X production process, first, as shown in FIG. 9A, the nonwoven fabric sheets 7 and 8 are fitted on the mounting shaft 2 in sequence so that multiple nonwoven fabric sheets 7 and 8 are stacked on one clamping jig 16 (the first jig). In other words, the nonwoven fabric sheets 7 and 8 are stacked with the mounting shaft 2 inserted in their holes 5 and 9. In the figure, the nonwoven fabric sheets 8 are not shown (the same applies hereafter). Then, as shown in FIG. 9B, another clamping jig 17 (the second jig) is fitted on the mounting shaft 2 and additionally placed on top of a given number of stacked nonwoven fabric sheets 7 and 8. The above process is called "the stacking process" hereafter.

Figure 9C:
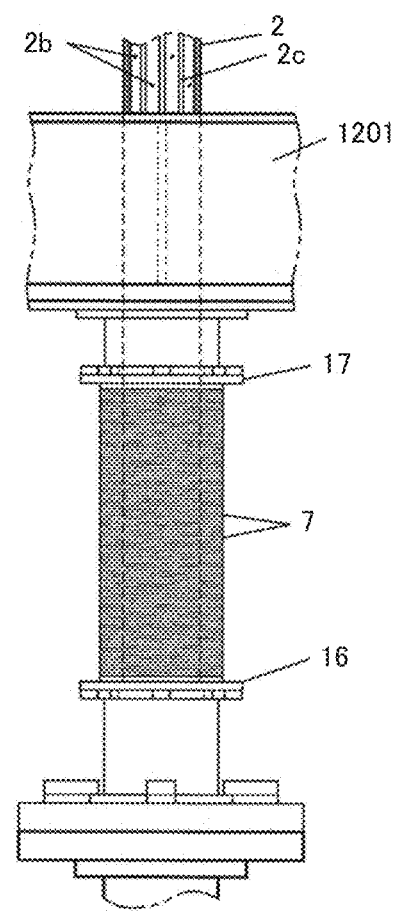
FIG. 9C is an illustration showing the module functional roll production process.
Figure 9D:
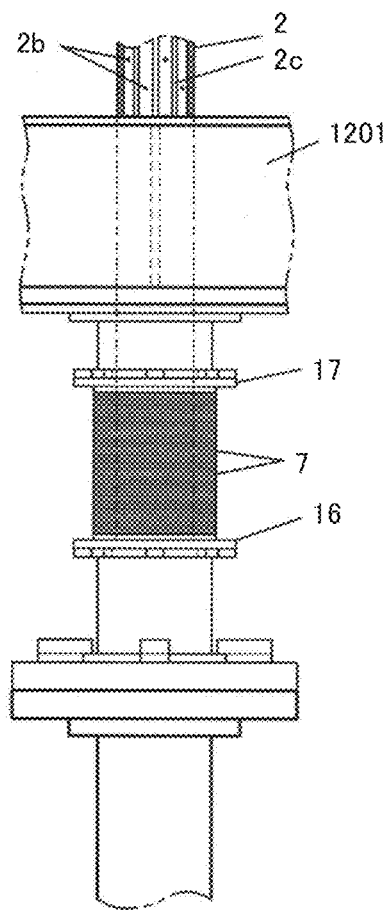
FIG. 9D is an illustration showing the module functional roll production process.
Figure 9E:
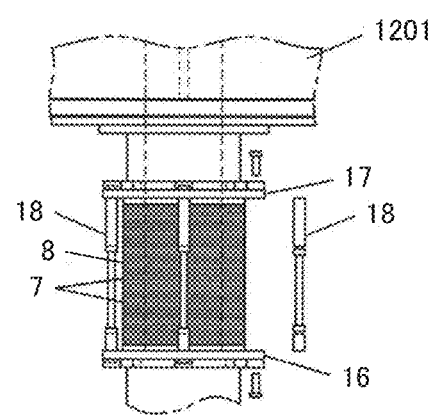
FIG. 9E is an illustration showing the module functional roll production process.

After the additional placement, as shown in FIG. 9C, the one clamping jig 16 and stacked nonwoven fabric sheets 7 and 8 are pressurized and provisionally clamped with the cylinder 1200 while the other clamping jig 17 is pressed with the pressing collar 1201. In this pressurizing/provisional clamping process, the stacked nonwoven fabric sheets 7 and 8 (a nonwoven fabric sheet group) and the one clamping jig 16 are pressed up while the other clamping jig 17 is pressed down. FIG. 9D shows the state after the pressurizing/provisional clamping process. Consequently, the stacked nonwoven fabric sheets 7 and 8 are clamped between the one and other clamping jigs 16 and 17, and the stacked nonwoven fabric sheets 7 and 8 are compressed in the direction parallel to the mounting shaft 2 via the clamping jigs 16 and 17. In the pressurizing/provisional clamping process, pressurized by the pressing machine 12, multiple strips of bridging elastic bodies 100 scattered on the front and back sides 1a and 1b of the nonwoven fabric sheet material 1 are press-bonded to each other. After the pressurizing/provisional clamping process, as shown in FIG. 9E, restrainers 18 are mounted (the restrainer mounting process). Consequently, the clamping jigs 16 and 17 are immobilized to each other and the stacked nonwoven fabric sheets 7 and 8 are united.

Figure 9F:
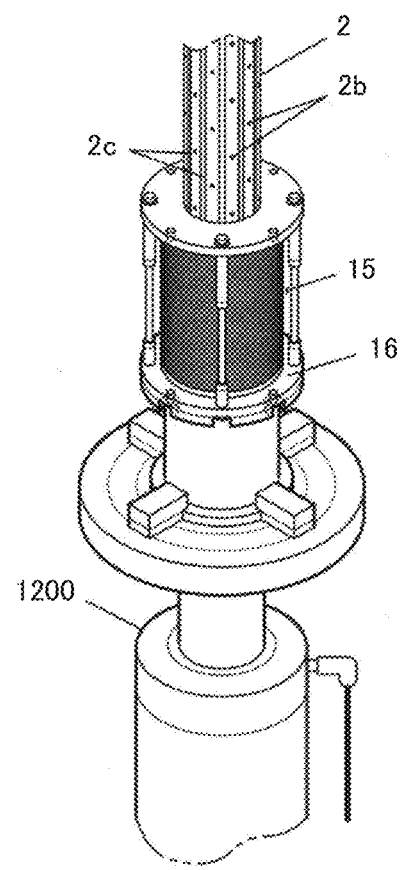
FIG. 9F is an illustration showing the module functional roll production process.

The above stacking, pressurizing/provisional clamping, and restrainer mounting processes are each performed once in sequence to provisionally form one module functional roll 15. The stacking, pressurizing/provisional clamping, and restrainer mounting processes are collectively called "the module functional roll provisional-forming process." FIG. 9F is a perspective view showing a provisionally-formed module functional roll 15.

Figure 10A:
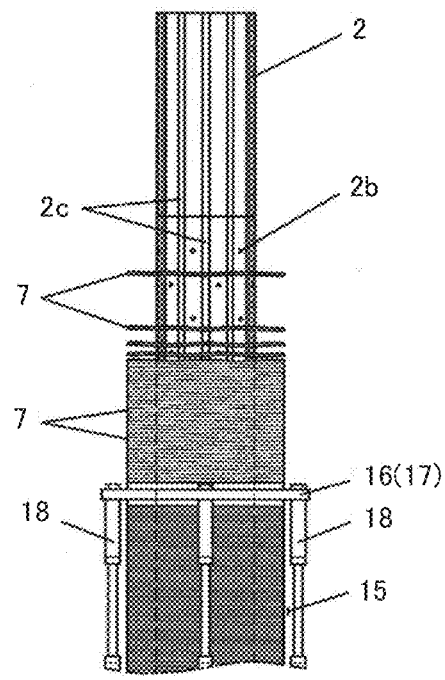
FIG. 10A is an illustration showing the module functional roll production process.
Figure 10B:
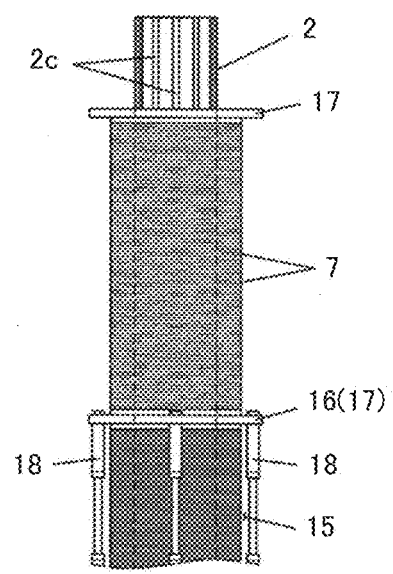
FIG. 10B is an illustration showing the module functional roll production process.

In this embodiment, the module functional roll provisional-forming process is repeated multiple times to provisionally form multiple module functional rolls 15. More specifically, as shown in FIG. 10A, the other clamping jig 17 with which the previous pressurizing/provisional clamping process is completed is used as the one clamping jig 16 this time. The nonwoven fabric sheets 7 and 8 are fitted in sequence on top of the other clamping jig 17 with which the pressurizing/provisional clamping process is completed to stack multiple nonwoven fabric sheets 7 and 8. In other words, multiple other nonwoven fabric sheets 7 and 8 are stacked while the mounting shaft 2 running through the nonwoven fabric sheets 7 and 8 united by the clamping jigs 16 and 17 remains inserted. Then, as shown in FIG. 10B, another clamping jig 17 (the third jig) is fitted on the mounting shaft 2 and additionally placed on top of a given number of stacked nonwoven fabric sheets 7 and 8 (a nonwoven fabric sheet group consisting of multiple newly stacked nonwoven fabric sheets) (the stacking process).

Figure 10C:
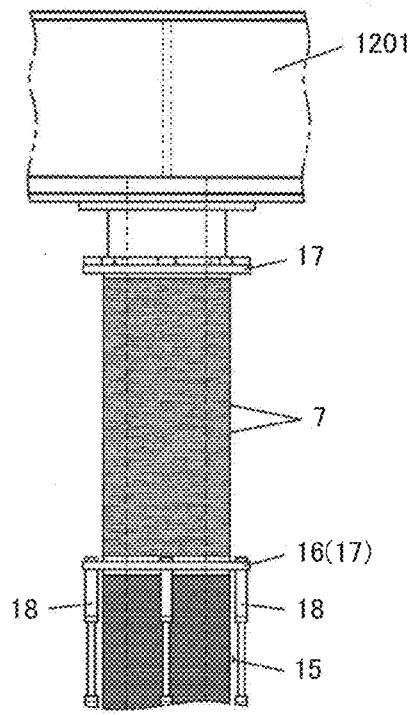
FIG. 10C is an illustration showing the module functional roll production process.
Figure 10D:
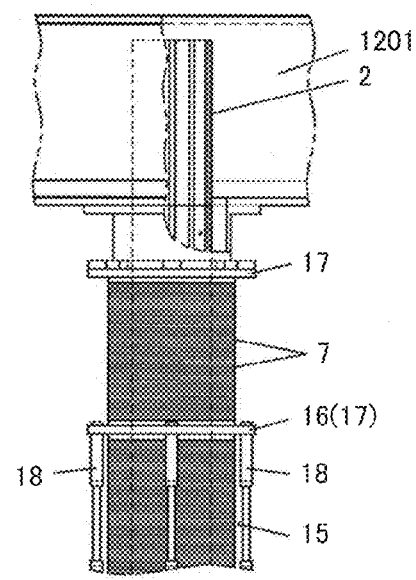
FIG. 10D is an illustration showing the module functional roll production process.
Figure 10E:
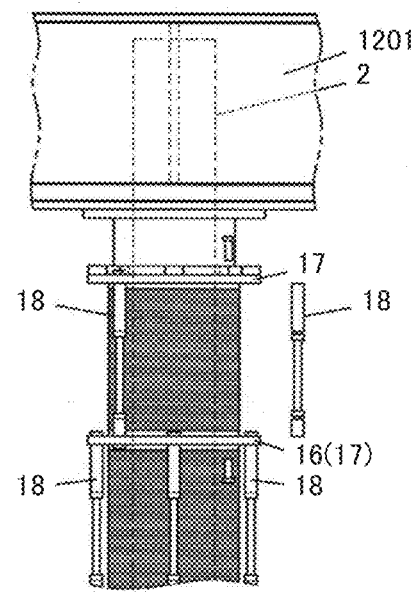
FIG. 10E is an illustration showing the module functional roll production process.

After the additional placement, as shown in FIGS. 10C and 10D, the pressurizing/provisional clamping process is performed. FIG. 10C shows the state before the pressurizing/provisional clamping process and FIG. 10D shows the state after the pressurizing/provisional clamping process. In the pressurizing/provisional clamping process, the stacked nonwoven fabric sheets 7 and 8 are clamped between the one and other clamping jigs 16 and 17, and the stacked nonwoven fabric sheets 7 and 8 are compressed in the direction parallel to the mounting shaft 2 via the clamping jigs 16 and 17. FIG. 10E shows how the restrainers 18 are mounted after the pressurizing/provisional clamping process (the restrainer mounting process).

The above module functional roll provisional-forming process is repeated multiple times, and multiple module functional rolls 15 are provisionally formed along the mounting shaft 2.

Figure 11A:
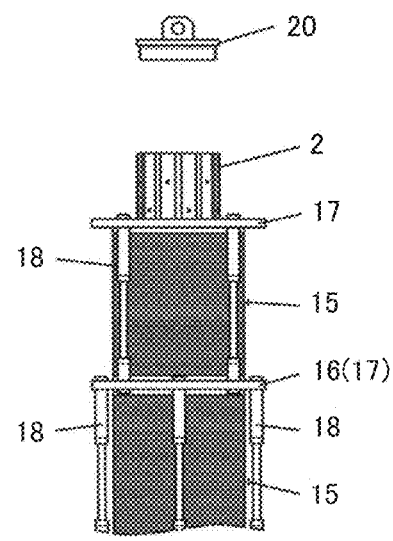
FIG. 11A is an illustration showing the module functional roll production process.
Figure 11B:
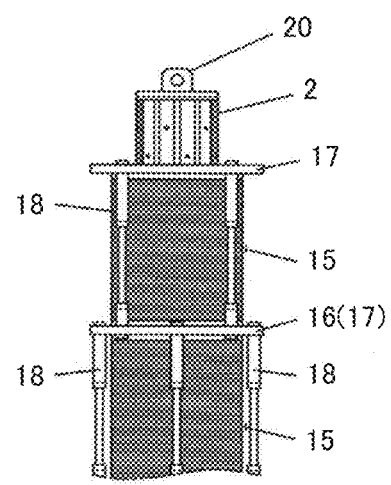
FIG. 11B is an illustration showing the module functional roll production process.
Figure 11C:
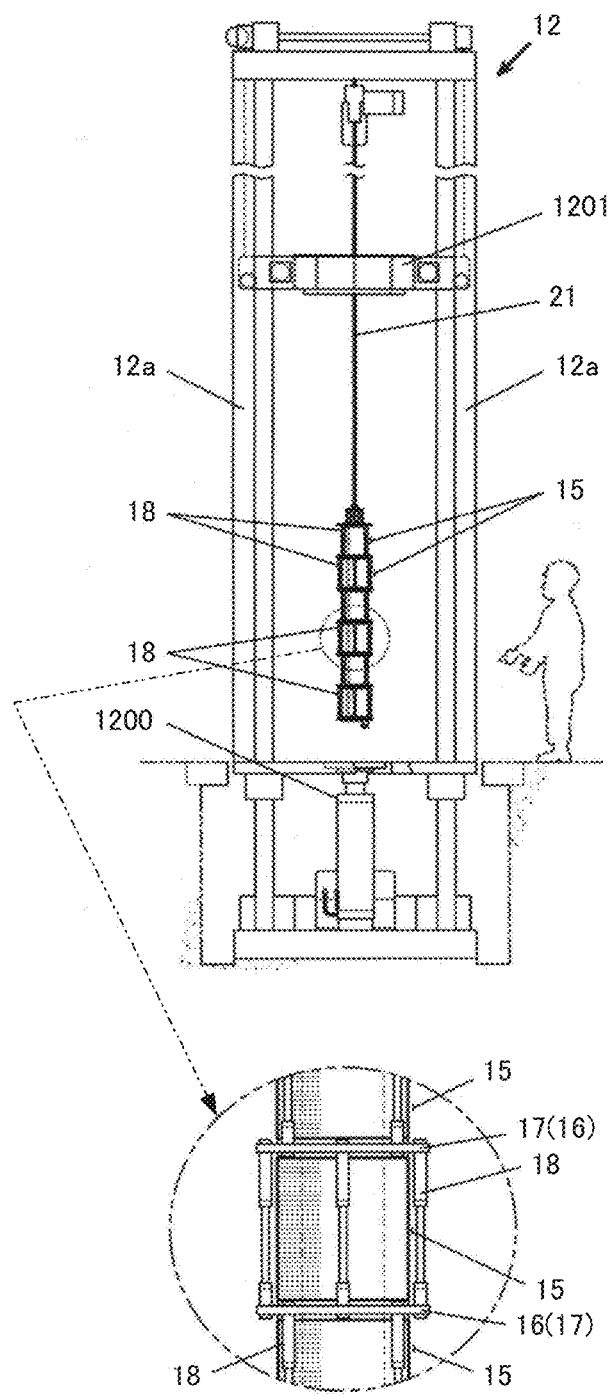
FIG. 11C is an illustration showing the module functional roll production process.
Figure 11D:
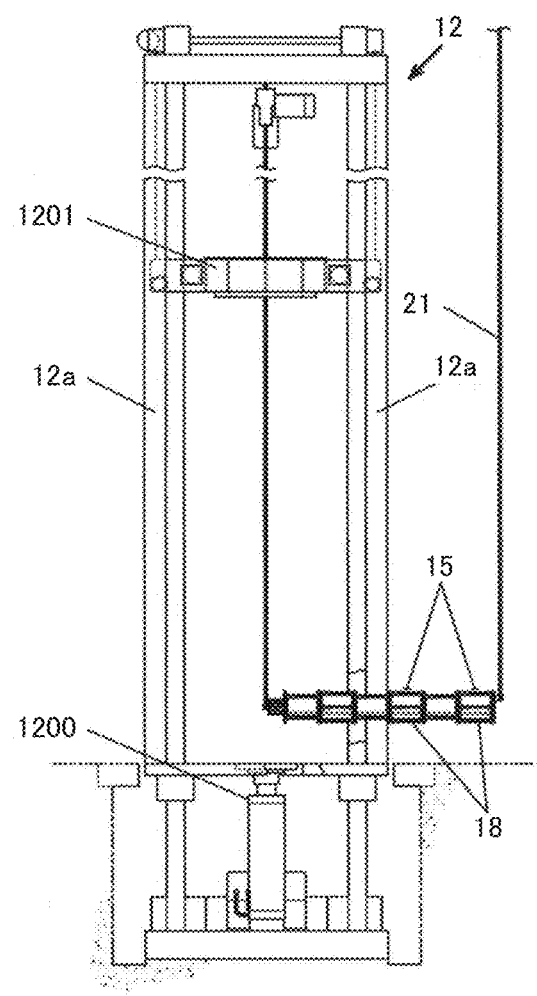
FIG. 11D is an illustration showing the module functional roll production process.

After multiple module functional rolls 15 are provisionally formed along the mounting shaft 2, as shown in FIG. 11A, a suspension jig 20 is attached to the upper opening of the hollow 2a of the mounting shaft 2. FIG. 11B shows the state after the suspension jig 20 is attached. After the suspension jig 20 is attached, the multiple module functional rolls 15 are suspended along with the mounting shaft 2 using a crane (not shown) and a wire 21 as shown in FIG. 11C. The multiple module functional rolls 15 are transported as shown in FIG. 11D. An enlarged view of the part in a broken-line circle in FIG. 11C is given below the FIG. 11C. The module functional rolls 15 are secured by the restrainers 18 and clamping jigs 16 and 17 while they are transported.

Figure 12A:
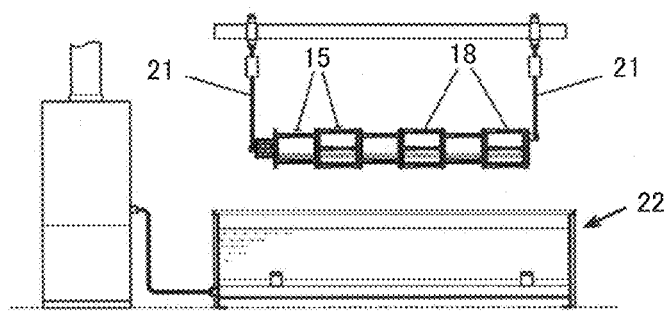
FIG. 12A is an illustration showing the module functional roll production process.
Figure 12B:
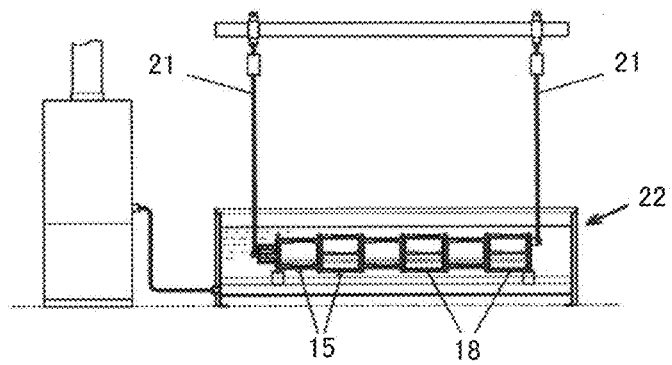
FIG. 12B is an illustration showing the module functional roll production process.
Figure 12C:
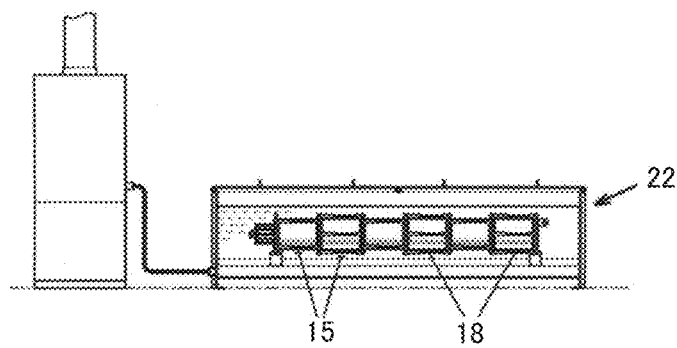
FIG. 12C is an illustration showing the module functional roll production process.

Then, a boiling process is performed. In the boiling process, a hot water tank 22 shown in FIG. 12A is used. The hot water tank 22 holds hot water. The temperature of the hot water is almost the boiling point. In the boiling process, as shown in FIG. 12B, the module functional rolls 15 are immersed in the hot water along with the mounting shaft 2. FIG. 12C shows how the module functional rolls 15 are immersed. The immersion time is approximately one to two hours. Because of the heat from the hot water, the strips of bridging elastic bodies 100 scattered on the front and back sides 1a and 1b of the nonwoven fabric sheet material 1 undergo thermal fusion and adhere to each other, whereby the module functional rolls 15 are united. In other words, the nonwoven fabric sheets 7 and 8 adhere to each other under heat. Here, the module functional rolls 15 do not adhere to each other because of the clamping jigs 16 and 17 in-between.

Because the mounting shaft 2 has the hollow 2a and pores 2b, the hot water infiltrates evenly and the adhesion progresses efficiently and reliably. The hollow 2a and pores 2b of the mounting shaft 2 serve as fluid passages.

Figure 13A:
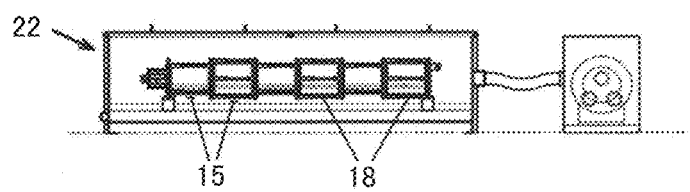
FIG. 13A is an illustration showing the module functional roll production process.

The boiling process is followed by a drying process. The hot water tank 22 is also used in the drying process. More specifically, the hot water in the hot water tank 22 is drained (discharged) and the hot water tank 22 is used as a drying tank. In the drying process, first, as shown in FIG. 13A, a vacuum pump is connected to the hot water tank 22 via a hose in order to dry and/or cool the module functional rolls 15. For drying and cooling, the hollow 2a and pores 2b of the mounting shaft 2 serve as air passages. For drying and cooling, for example, hot air of approximately 80° C. is sent for 10 hours, which is followed by cooling.

Figure 13B:
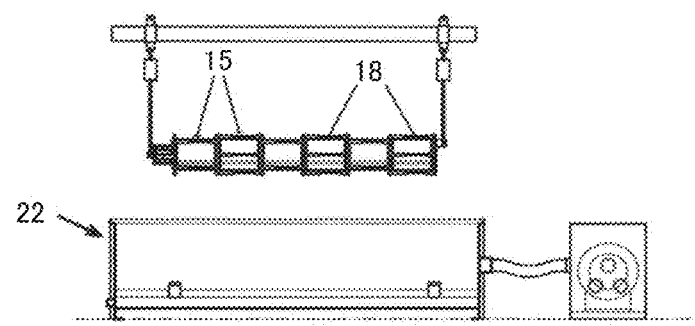
FIG. 13B is an illustration showing the module functional roll production process.
Figure 13C:
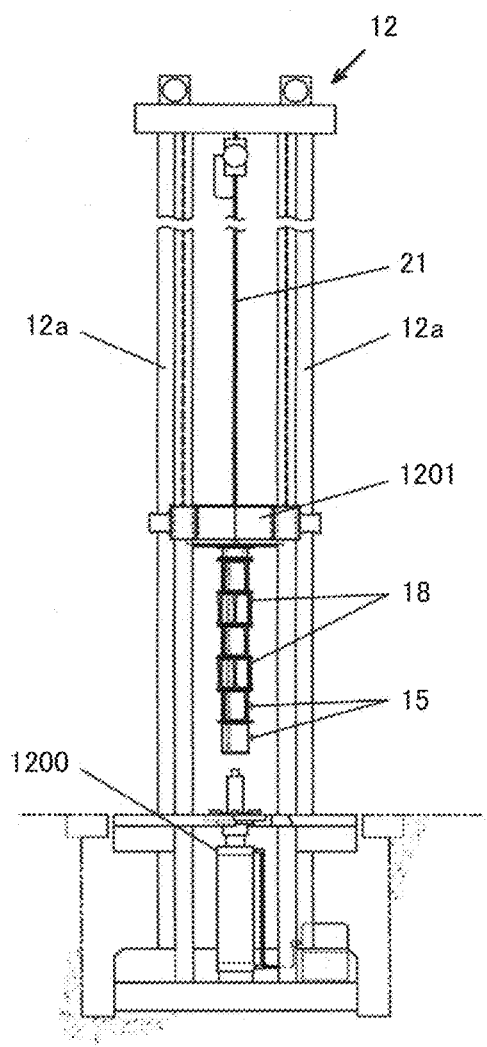
FIG. 13C is an illustration showing the module functional roll production process.

After the drying process ends, as shown in FIG. 13B, the module functional rolls 15 are withdrawn from the hot water tank 22. Then, as shown in FIG. 13C, the module functional rolls 15 are transferred again to the pressing machine 12 along with the mounting shaft 2.

Figure 14:
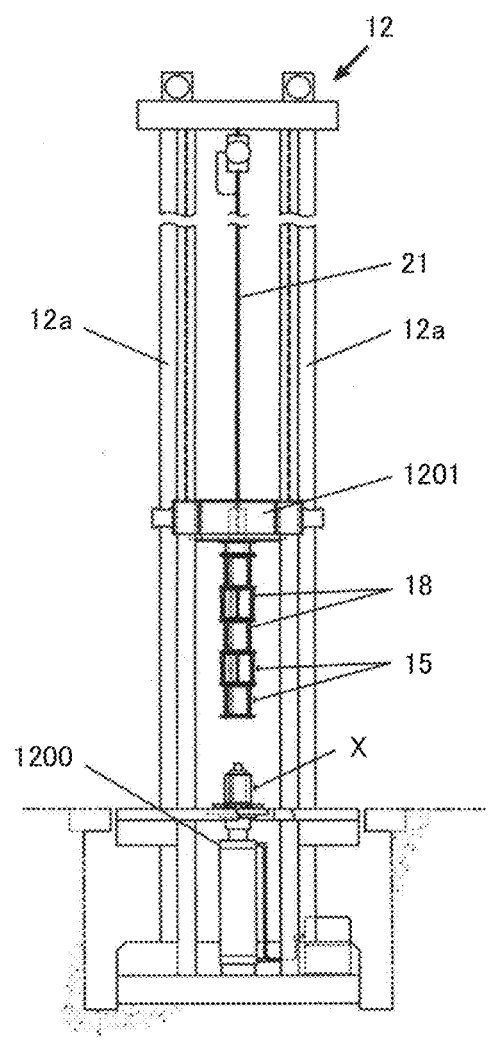
FIG. 14 is an illustration showing the module functional roll production process.

Then, a disassembling process is performed. In the disassembling process, as shown in FIG. 14, starting with the lowest module functional roll 15, the multiple module functional rolls 15 are removed from the mounting shaft 2 in sequence by detaching the restrainers 18 and clamping jigs 16 and 17. Then, the module functional rolls 15 are subject to a finishing process such as surface polishing and clarification. Then, multiple module functional rolls X are produced. In the module functional roll X, the nonwoven fabric sheets 7 and 8 adhered to each other.

(2-3. Production of Functional Roll)

The module functional rolls X are packaged as they are and delivered to a customer such as a plant and processing place. Then, at the place where they are delivered such as a plant, the functional roll 3 shown in FIG. 1 is finally assembled.

More specifically, multiple module functional rolls X are stacked with the shaft body 300 running through the bore 300a, the flanges 302 are fitted on the ends of the shaft body 300, and the bearings 301 are provided on the ends, whereby the functional roll 3 shown in FIG. 1 is assembled. Consequently, the multiple module functional rolls X are united with the shaft body 300 inserted. This is an assembling work: the functional roll 3 can be produced simply and in a short time without skill. Furthermore, no special equipment (for example, the above-described pressing machine 12) is required for the assembling work. Therefore, the assembling work can be done at the customer's place.

In the case of delivering the module functional rolls X to the customer and finally assembling the functional roll 3 at the customer's place as shown in the above embodiment, the module functional rolls X, which are smaller than the functional roll 3, are transported to the customer. Then, the transportation is facilitated compared with transporting the large functional roll 3. Furthermore, in the event that some of the module functional rolls X of the functional roll 3 have a failure, that module functional roll X can be replaced at the customer's place.

An embodiment of the present invention is described above. Other embodiments having the same object and characteristics naturally fall under the scope of the present invention. For example, in the above embodiment, the nonwoven fabric sheets 7 and 8 are used to produce a module functional roll X. It is possible to use only the nonwoven fabric sheets 7 to produce a module functional roll X. In other words, one kind of nonwoven fabric sheets can be used to produce a module functional roll X. Alternatively, three or more kinds of nonwoven fabric sheets can be used to produce a module functional roll X.

In the above embodiment, the diameter of the circumference of the nonwoven fabric sheets 7 is equal to the diameter of the circumference of the nonwoven fabric sheets 8. This is not restrictive. The outer diameter of the nonwoven fabric sheets 8 can be smaller than the outer diameter of the nonwoven fabric sheets 7. Furthermore, the nonwoven fabric sheets 8 can be made of the same material as the nonwoven fabric sheets 7. In the above embodiment, the hot water tank 22 is used as the drying tank. The drying tank can be prepared separately. However, if the hot water tank in the boiling process is also used as the drying tank in the drying process, the same place and the same tank make the work smooth and simple. It is possible to perform a vacuum process after the boiling process of the embodiment in which a hose provided to the mounting shaft 2 is connected to a pump to suck the water.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

1 Nonwoven fabric sheet material
1a Superimposed surface
1b Superimposed surface
100 Bridging elastic body
101, 102 Square frame
2 Mounting shaft
2a Hollow
2b Pore
2c Locking groove
3 Functional roll
300 Shaft body
301 Bearing
302 Flange
303 Roll body
303a Bore
5, 9 Hole
6 Circular peripheral surface
7 Nonwoven fabric sheet
7a Notch
8 Nonwoven fabric sheet
8a Extension
10 Circular peripheral surface
12 Pressing machine
12a Frame
1200 Cylinder
1201 Pressing collar
15, X Module functional roll
16 One clamping jig
17 Other clamping jig
18 Restrainer
20 Suspension jig
21 Wire
22 Hot water tank
A Transfer conveyer
B Nonwoven fabric material
C Nonwoven fabric
D Bridging elastic material reservoir
E Bridging elastic material

What is claimed is:

1. A method of producing modules that form a roll body of a functional roll comprising nonwoven fabric sheets including the following steps:

stacking multiple nonwoven fabric sheets shaped into a circular form with an opening in the center while a mounting shaft defining an axis is inserted in the opening;

clamping a first nonwoven fabric sheet group comprising the multiple stacked nonwoven fabric sheets with a first jig and a second jig, and compressing the first nonwoven fabric sheet group in a direction parallel to the axis of the mounting shaft via the first and second jigs;

securing the first and second jigs to each other to unite the compressed nonwoven fabric sheets forming the first nonwoven fabric sheet group;

stacking multiple nonwoven fabric sheets other than the nonwoven fabric sheets forming the first nonwoven fabric sheet group while the mounting shaft running through the first nonwoven fabric sheet group united with the first and second jigs is inserted;

clamping a second nonwoven fabric sheet group comprising the multiple newly stacked nonwoven fabric sheets with the second jig and a third jig, and compressing the nonwoven fabric sheet group in a direction parallel to the axis of the mounting shaft via the second and third jigs;

securing the second and third jigs to each other to unite the compressed nonwoven fabric sheets forming the second nonwoven fabric sheet group;

heating the first and second united nonwoven fabric sheet groups so that the nonwoven fabric sheets forming the first nonwoven fabric sheet group adhere to each other and the nonwoven fabric sheets forming the second nonwoven fabric sheet adhere to each other; and removing the mounting shaft and jigs from the nonwoven fabric sheets adhering to each other to create multiple modules comprising the nonwoven fabric sheets adhering to each other.

2. The method of producing a functional roll according to claim 1, wherein heating the united nonwoven fabric sheet groups is realized by using hot water.

3. The method of producing a functional roll according to claim 1, including a step of adding bridging elastic bodies on at least one of the surfaces of the nonwoven fabric sheets before the nonwoven fabric sheets are stacked.

4. The method of producing a functional roll according to claim 3, wherein a nonwoven fabric sheet material used as the material of the nonwoven fabric sheet is prepared with a step to apply the bridging elastic bodies to both the front and back sides of the nonwoven fabric.

5. The method of producing a functional roll according to claim 1, wherein in the step of stacking the multiple nonwoven fabric sheets, a first nonwoven fabric sheet and a second nonwoven fabric sheet of which the density is lower than that of the first nonwoven fabric sheet are stacked.

6. The method of producing a functional roll according to claim 5, wherein the outer diameter of the first nonwoven fabric sheet is larger than the outer diameter of the second nonwoven fabric sheet.

7. The method of producing a functional roll according to claim 5, wherein the second nonwoven fabric sheets are provided at given intervals along the mounting shaft.

8. The method of producing a functional roll according to claim 1, wherein the mounting shaft is hollow and has multiple pores formed in the peripheral wall.

* * * * *